Sept. 2, 1924.

H. L. SCHIEBER

PRESSURE GAUGE

Filed Oct. 30, 1922

1,507,031

H. L. Schieber
INVENTOR

BY Victor J. Evans
ATTORNEY

WITNESS:

Patented Sept. 2, 1924.

UNITED STATES PATENT OFFICE.

HAROLD L. SCHIEBER, OF CASPIAN, MICHIGAN.

PRESSURE GAUGE.

Application filed October 30, 1922. Serial No. 597,960.

*To all whom it may concern:*

Be it known that I, HAROLD L. SCHIEBER, a citizen of the United States, residing at Caspian, in the county of Iron and State of Michigan, have invented new and useful Improvements in Pressure Gauges, of which the following is a specification.

The object of my said invention is the provision of a simple, compact and reliable pressure gauge, designed more particularly for use in interposed relation between an air pump and a tire with a view to enabling an operator to perceive when the desired pressure is put in the tire.

To the attainment of the foregoing, the invention consists in the improvement as hereinafter described and definitely claimed.

In the accompanying drawings, forming part of this specification:—

Similar numerals of reference designate corresponding parts in all of the views of the drawings.

Figure 1:
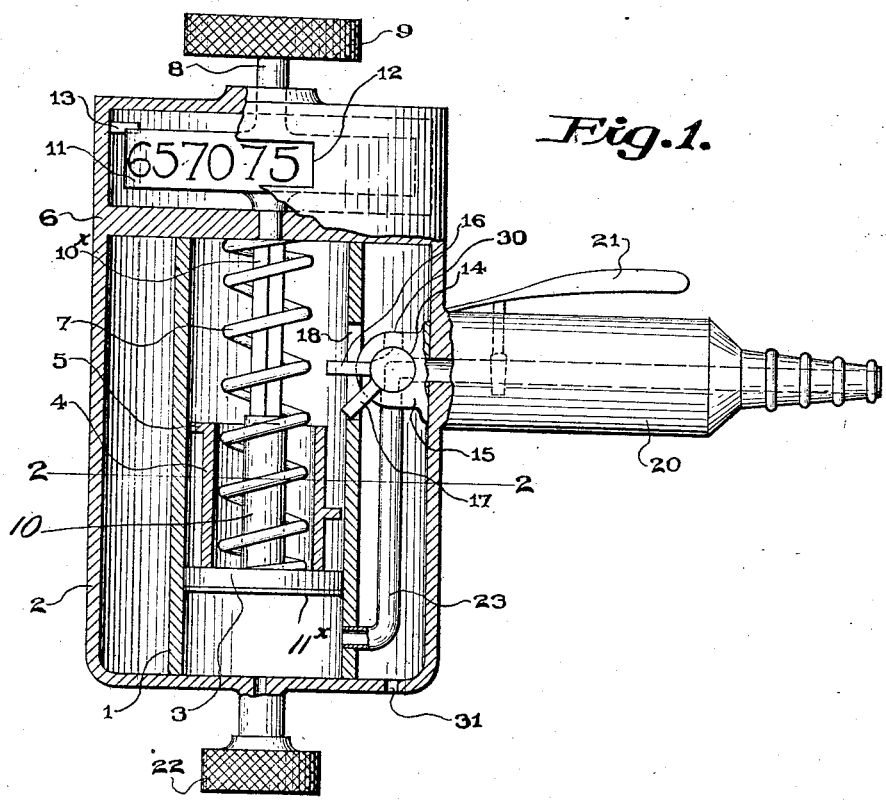
Figure 1 is a vertical section of the gauge constituting the best practical embodiment of my invention that I have as yet devised, with some parts in elevation.
Figure 2:
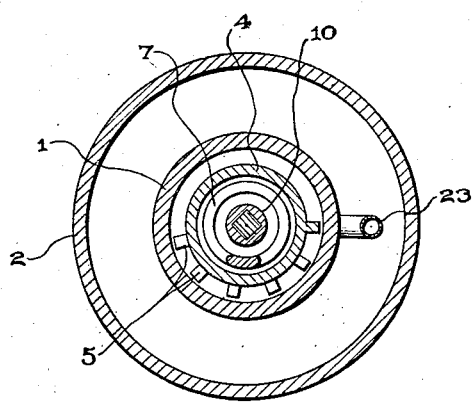
Figure 2 is a transverse section taken in the plane indicated by the line 2—2 of Figure 1.

Among other elements my novel gauge comprises a cylinder 1, disposed in a casing 2. Movable in the cylinder 1 is a piston 3 on which is a studded cylinder 4, the studs designated by 5 being spaced apart and arranged one above the other about the cylinder 4. A partition 6 is fixed in the casing adjacent to and in spaced relation to the upper head of the casing, and between the piston and the said partition 6 is interposed a coiled spring 7. At 8 is a shaft at the upper end of which is a knurled disk or wheel 9. The said shaft extends through the partition 6 and also through the spring and is of angular form in cross-section below the partition 6 as designated by $10^x$. Connected to the piston and slidably receiving the shaft 8 is a tubular shaft 10 of corresponding interior angular form in cross-section. Disposed below the piston 3 for the support thereof is a spider disk $11^x$ that is connected to the shaft portion $10^x$. It will also be noticed that a wheel or disk 11 is appropriately fixed on the shaft 8 at a point between the partition and the upper head of the casing, the said wheel or disk 11 bearing on its periphery figures indicative of various pressures. These figures are designed to be displayed through an opening 12 in the casing, and the said figures are so arranged that but one number is displayed at a time. The said wheel 11 is provided with a series of notches for the engagement of a resilient pawl 13, designed to hold the wheel and the shaft 8 against retrograde rotation.

Within the casing 2 is a pet cock 14 ported as illustrated and operable in a casing 15 which is also arranged within the casing 2. Carried by the plug 14 are projections 16 and 17 which extend within the cylinder 1 through an opening 18 in the wall thereof. Carried at the side of the casing 2 and communicating with the ported casing of the pet cock is a tube 20, for the connection of a hose leading from an air pump. The said tube 20 is preferably though not necessarily provided with a manually operable valve 21.

The casing 2 is provided at its lower end with a tubular connection 22 to engage a tire valve, the said tubular connection 22 being in communication with the lower end of the cylinder 1. It will also be noticed that a conduit 23 is connected with the interior of the cylinder 1 at a point below the piston 3; the said conduit 23 being connected at its upper end to the casing of the pet cock.

In the practical operation of my improvement, my novel device is interposed between and connected with a tire valve and a pump of any appropriate description. In this connection I would have it understood that when a hand pump is employed the valve 21 may be dispensed with.

Precedent to the putting of pressure into the tire the wheel or disk 9 is turned by the operator until the number of the pressure desired appears in the opening of the casing 2. In consequence of such operation the piston will be so positioned that the stud thereon corresponding to the mentioned pressure is alined with one of the projections on the pet cock. As the pressure fluid is pumped into the tire, some of the fluid passes the perforated or spider disk $11^x$, and the piston which is packed, of course, to preclude leakage is raised against the action of the spring, and hence when the desired pressure is attained the mentioned stud of the piston will engage one of the pet cock projections and close the pet cock.

On the said closing of the pet cock—i. e., the closing of the upper end of the conduit 23, a by-pass 30 will be opened to the space between the cylinder 1 and the casing 2 whereupon pressure will escape from the casing 2 through the vent 31 therein, and in this way the operator will be apprised of the fact that the desired pressure has been put in the tire. On removal of the gauge from the tire valve, the down stroke of the piston under the action of the spring will cause the mentioned stud on the piston to engage the other projection of the pet cock with the result that the pet cock will be put into communication with the conduit 23, and the gauge will be rendered ready for another operation.

In addition to the practical advantages hereinafter described to my novel gauge it will be noted that the gauge is simple and inexpensive in construction, reliable in operation and is well adapted to withstand the usage to which devices of corresponding character are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. In a pressure gauge, the combination of a casing with a display opening and with means at one end for the connection of the casing to a tire valve, a cylinder in the casing and in communication with said connecting means, a spring-backed piston in said cylinder and movable rectilinearly and about its axis and having studs spaced apart and arranged about it, a tubular shaft of angular form in cross-section connected and movable with the piston, a shaft journaled in the casing and having an angular portion arranged in the tubular shaft and also having a finger piece, a wheel or disk fixed to the shaft bearing the finger piece and having numbers adapted to be displayed through the said opening in the casing, a pet cock with projections arranged to be engaged by the studs of the piston, a casing containing the said pet cock and adapted to be connected with a source of fluid pressure supply, and a conduit intermediate the pet cock casing and the cylinder.

2. In a presser gauge, the combination of a casing with a display opening and with means at one end for the connection of the casing to a tire valve, a cylinder in the casing and in communication with said connecting means, a spring-backed piston in said cylinder and movable rectilinearly and about its axis and having studs spaced apart and arranged about it, a tubular shaft of angular form in cross-section connected and movable with the piston, a shaft journaled in the casing and having an angular portion arranged in the tubular shaft and also having a finger piece, a wheel or disk fixed to the shaft bearing the finger piece and having numbers adapted to be displayed through the said opening in the casing, a pet cock with projections arranged to be engaged by the studs of the piston, a casing containing the said pet cock and adapted to be connected with a source of fluid pressure supply, and a conduit intermediate the pet cock casing and the cylinder; the said casing of the pet cock having an exhaust port in communication with the interior of the first-named casing, and said first-named casing having a vent.

3. In a pressure gauge, the combination of a casing, a cylinder in said casing, a spring backed piston contained in said cylinder and movable rectilinearly and about its axis relative thereto, manual means for setting said piston, a pet cock adapted to be connected with a source of fluid pressure supply, and a connection between the said pet cock and said piston cylinder.

4. The combination of a piston subject to the action of a spring and movable rectilinearly and about its axis and capable of manual adjustment, a cylinder containing said piston, a cock operable by movement of the piston and adapted to be connected with a source of fluid pressure supply, and a connection between said cock and the cylinder containing the piston.

In testimony whereof I affix my signature.

HAROLD L. SCHIEBER.